United States Patent [19]
Glabe et al.

[11] 3,985,912
[45] Oct. 12, 1976

[54] SOLIDIFIED PRODUCT FROM MOLASSES AND WHEAT FLOUR

[75] Inventors: Elmer F. Glabe, Northbrook; Perry W. Anderson, Niles; Stergios Laftsidis, Chicago, all of Ill.

[73] Assignee: Food Technology, Inc., Chicago, Ill.

[22] Filed: Dec. 31, 1975

[21] Appl. No.: 645,538

[52] U.S. Cl. .......... 426/622; 426/658; 127/29
[51] Int. Cl.$^2$ .......... A23L 1/09
[58] Field of Search .......... 426/658, 622, 471; 127/29, 58

[56] References Cited

UNITED STATES PATENTS

| | | | |
|---|---|---|---|
| 2,707,151 | 4/1955 | Martin | 426/658 |
| 3,843,821 | 10/1974 | Glabe et al. | 426/471 |
| 3,893,842 | 7/1975 | Glabe et al. | 127/58 |

*Primary Examiner*—Jeanette M. Hunter

[57] ABSTRACT

A solidified product from molasses is prepared by a process in which wheat flour is incorporated with molasses to form a slurry prior to dehydration of the slurry as a thin film on a heated surface.

4 Claims, No Drawings

SOLIDIFIED PRODUCT FROM MOLASSES AND WHEAT FLOUR

BACKGROUND OF THE INVENTION

The term "molasses" as used herein refers to the uncrystallizable syrup obtained on boiling down raw cane sugar or beet sugar. It usually contains 70 to 75% solids and 30 to 25% water.

While it is common to use molasses in its liquid form, it is difficult to handle in this form and it is desirable to provide a solidified molasses product in the form of a dry appearing flowable powder similar to cane sugar. Ordinary cane sugar, although hygroscopic, maintains its free-flowing properties. A solid product which is free-flowing has a number of advantages, especially in making food products, for example, bread, cakes, pastries, ice cream and the like.

In U.S. Pat. Nos. 3,843,821 and 3,893,842, a process of preparing a solidified molasses is described as well as the resultant product. In the aforesaid patents an improved process and product are provided by using a soy protein flour having certain defined characteristics, with or without starches or flours. Wheat flour is mentioned as being useful but less desirable because of flavor and taste of the finished product. It would be desirable to make a solidified molasses product containing wheat flour because of the ready availability, cost and protein content of wheat flour.

OBJECTS

One of the objects of the present invention is to provide a process for preparing a solidified molasses product containing wheat flour.

Another object is to utilize the thin film principle of drying molasses with the addition of wheat flour as an additive to the slurry to be dehydrated.

A further object of the invention is to produce solidified compositions of the type described having a substantial protein content. Other objects will appear hereinafter.

BRIEF SUMMARY OF THE INVENTION

In accordance with the invention molasses is dehydrated by intimately mixing it with wheat flour, with or without an at least partially de-fatted soy protein flour, in sufficient amount to form a slurry, and subsequently subjecting said slurry in a thin film to a heated surface for a period of time sufficient to dehydrate said slurry, the protein content of said soy protein flour being at least 45% by weight, the water soluble protein content being at least 20% by weight, the weight ratio of water soluble protein to fat content being at least 1.5:1 and the quantity of said soy protein flour being sufficient to enhance the crispness of said film so that the dehydrated film assumes a crystalline character more rapidly than would be the case without the addition of such soy protein. The resultant dehydrated film is therefore essentially non-adhesive and can readily be ground to a dry-appearing, flowable powder free of gummy, sticky, and lumpy characteristics. The problem of "double sheeting" is thereby avoided and the rate of production can be increased. At the same time a product is obtained containing a substantial amount of protein which is advantageous from the standpoint of food value. De-aerating agents (emulsifiers) are preferably added and antihumectants can be added to the product.

DETAILED DESCRIPTION OF THE INVENTION

The product obtained in accordance with the invention consists essentially of the following ingredients:

| Ingredients | Parts by Weight |
|---|---|
| Molasses solids | 40–75 |
| Wheat flour | 55–20 |
| Soy protein flour of the type previously described | 0–5 |
| Water | 0.5–5.0 |
| Emulsifier | 0–1 |
| Anti-humectant | 0–1 |

The invention is based upon the discovery that wheat flour when intimately mixed with molasses, with or without soy protein flour to form a slurry and subsequently subjecting said slurry in a thin film to a heated surface for a period of time sufficient to dehydrate said slurry will produce a satisfactory dehydrated molasses product.

In order to be effective, the soy protein flour must have a high protein content of at least 4% by weight and the water soluble protein content should be at least 20% by weight of the total protein content, preferably within the range of 20 to 90% by weight. A soy protein should be used which has been at least partially defatted and the weight ratio of water soluble protein to fat content should be at least 1.5:1 and preferably within the range of 1.5:1 to 90:1. Percentagewise in terms of weight per cent the fat content of the soy protein is usually within the range of 1 to 16%, but a soy protein having a high protein content and a low fat content in which the water soluble protein content is relatively low is ineffective for the purpose of the invention.

The weight ratio of molasses to wheat flour is preferably 40–80:60–20 and the amount of soy protein added is 0 to 5% by weight of the total wheat flour and molasses, preferably 0.5 to 2% by weight.

The slurry is heated to a temperature 15° to 30° below the gelatinization temperature of the wheat flour and held at said temperature until the starch in the wheat flour is conditioned to the extent that it will only partially gelatinize when subsequently heated above the gelatinization temperature. Thus, when the slurry is in a thin film and is heated on a heated surface above said gelatinization temperature for a period of time sufficient to dehydrate the slurry, the starch in the wheat flour is simultaneously partially gelatinized. At the same time the presence of a soy protein of the type described in the amounts previously indicated results in the production of a crisp dehydrated film of crystalline character which is essentially non-adhesive and readily ground to a dry-appearing flowable powder.

In order to obtain optimum results the slurry containing the molasses and the other ingredients previously mentioned is deaerated during heating. Deaeration is facilitated by adding a small amount of an emulsifier, for example, 0.2% to 0.8% and usually not exceeding 1% of total solids. Emulsifiers contain both hydrophile and hydrophobe groups and are effective in causing the release of entrapped air. The deaeration which occurs can be observed by examination of the slurry under a microscope. A preferred deaerator is hydroxylated lecithin. Other suitable emulsifiers are glycerol mono- and distearate or any of the polyoxyethylated emulsifiers normally used in making bread and other bakery products.

Up to one-half of the wheat flour can be replaced by ungelatinized starch which has a gelatinization temperature not lower than 150° F. Examples of suitable starches are wheat, corn and rice starch. Wheat starch and rice starch are superior to corn starch because they are bland in flavor, whereas corn starch carries a definite flavor characteristic which it imparts to the finished dried product.

The term "wheat flour" as used herein covers hard wheat flour made from either hard red spring wheat or hard winter wheat. It also includes flour made from soft red and soft white winter wheats and spring wheats. Protein content of the wheat flour including all of these classes will range from 9.0% to 14.5%, calculated on a 10% moisture basis.

In the foregoing process, the thin film principle of drying is very important. Thin film drying can be accomplished in a number of ways on commercial drying equipment, for example, by using a double drum hot roll drier either operated at atmospheric pressures or in a vacuum chamber, and tray driers or conveyor driers, again operated either at atmospheric pressure or in a vacuum chamber. The essential feature of the drying method is to subject a thin film of the composition to be dried to a heated surface. The temperature of this surface is usually controlled in a range of 325° F. to 375° F. Exposure of the film to the surface is brief, consisting of approximately 5 to 30 seconds.

In a commercial process the drying process must meet the requirements of low cost to make the process feasible from a commercial standpoint. In terms of the drying process, this means that the raw slurry going to the driers must be easily handled and the dried material coming from the driers must also be in such condition that it can be handled with ease and can be converted into a granular or powdered mass quickly and easily. It should also remain in this condition over long periods of time.

The double drum hot roll drier is the preferred method of accomplishing the thin film drying step. Using this equipment, it is possible to adjust the surface temperature of the rollers by means of controlling the steam pressure entering the double drums. It should be understood, however, that other methods of effecting thin film drying are known and therefore will be applicable to the principle of this invention. The drying equipment, although important, is secondary to the thin film drying principle.

Where a double drum hot roll drier is used, the thickness of the sheet coming from the drying rolls is of some importance and is preferably around 0.011 inch and within the range of 0.006 to 0.015 inch. This can be determined by routine experimentation. If the sheet is too thin it will be too frangible and cause dusting and if it is too thick it may not assume a crystalline structure rapidly enough to meet production demands. In general, the sheet should be thick enough so that it is self-supporting and can be readily handled without being adhesive in character.

The invention will be further illustrated but is not limited by the following examples in which the amounts are by weight unless otherwise indicated.

EXAMPLES

The following ingredients were combined in a series of separate preparations:

| Example No. | Parts by Weight | | | |
|---|---|---|---|---|
| | Liquid Molasses | Wheat Starch | Wheat Flour | Soy Flour |
| 1 | 55 | — | 43 | — |
| 2 | 75 | — | 23 | — |
| 3 | 40 | — | 60 | — |
| 4 | 55 | — | 41 | 2 |
| 5 | 75 | 0 | 21 | 2 |
| 6 | 40 | — | 58 | 2 |
| 7 | 40 | 30 | 30 | — |
| 8 | 80 | 10 | 10 | — |
| 9 | 55 | 22.5 | 22.5 | — |

The molasses was warmed from approximately room temperature to approximately 110° F. The wheat flour and soy protein flour (where used) were then added and the mixture stirred until a smooth slurry was obtained. This slurry was then further warmed and held at an elevated temperature of 130° F. At this point 0.5 part by weight of hydroxylated lecithin was added and mixing was continued to deaerate the slurry. The time required for the first step was approximately 7 to 10 minutes and an additional 5 minutes was required to deaerate the slurry.

When mixing and deaeration was complete the heat was shut off and the mixer stopped. It was then allowed to stand for a minimum of 8 hours and as long as 16 hours. During this standing the temperature will have dropped below 130° F. The mixer was then started and heat applied to return the temperature to 130° F. At this point the slurry was ready for pumping to a double drum hot roll drier.

Upon being pumped to the drier the slurry is permitted to fall into the nip between the two counter-turning rollers. The steam pressure in the rollers is maintained preferably at about 85 pounds per square inch and the roller speed is usually 2.5 revolutions per minute. If the steam pressure is increased the roller speed is increased. If the steam pressure is lowered the roller speed is lowered. These are minor mechanical adjustments and are not essential features of the invention.

Adjustment of the aperture between the rollers should preferably be such as to produce a sheet of the desired thickness as previously described. The aperture may vary relative to the amount of additive versus the amount of molasses solids in the slurry.

When all of the above features have been carefully controlled, as in the examples, the film, when it reaches the knife blade, will be very easily shaved away from the surface of the hot rolls. The appearance of the sheet at the knife blade is that of a piece of thin paper. It is limber because the temperature is still quite high. As cooling takes place, however, the sheet becomes rapidly fragile and shatterable. This is a matter of seconds. The sheet is easily broken into flakes or granules and, if desired, can be passed through a hammermill or other milling device to reduce the particle size. If a powdered material is desired, the ideal particle size is 100% through 30 mesh (Standard sieve series).

This general procedure was used on a ten inch double drum hot roll drier with equipment for cooling the dehydrated product and with different types of soy proteins and different proportions of soy protein and wheat flour. Examples of suitable soy proteins are the following:

a. A soy protein (Soy Fluff 200-W) having a protein content of 53.0%, a water soluble protein content of 70.0% and a fat content of 1.0%, b. A soy protein (Soy Fluff 200-C) having a protein content of 53.0%, a water soluble protein content of 40.0% and a fat content of 1.0%, c. A soy protein (Soyalose 105) having a protein content of 52.5%, a water soluble protein content of 65.0% and a fat content of 6.0%, d. A soy protein (Soyarich 115) having a protein content of 45.0%, a water soluble protein content of 65.0% and a fat content of 16.0%, e. A soy protein (Pro-Fam 70H/s) having a protein content of 70.0%, a water soluble protein content of 90.0% and a fat content of 1.0%, and f. A soy protein (Pro-fam 90H/S) having a protein content of 90.0%, a water soluble protein content of 88.0% and a fat content of 1.0%.

Several other commercial soy proteins having the desired characteristics are also suitable, e.g., Ardex 550, NV Protein and Promine D.

Anti-humectants which can be employed are food grade antihumectants, e.g., calcium stearate, magnesium stearate and silica gel.

Throughout the specification and claims the "water solubility" of the water soluble soy protein refers to water solubility as determined by a standard testing method given in Association of Official Agricultural Chemists (A.O.A.C.) 9th Edition, page 164, test 13.032, published in 1960.

The invention is hereby claimed as follows:

1. A dehydrated molasses consisting essentially of the following ingredients:

| Ingredients | Parts by Weight |
|---|---|
| Molasses solids | 40–75 |
| Wheat flour | 55–20 |
| At least partially defatted soy protein flour having a protein content of at least 45% by weight, a water soluble protein content of at least 20% by weight of the total protein content, and a weight ratio of water soluble protein to fat content of at least 1.5:1 | 0–5 |
| Water | 0.5–5.0 |
| Emulsifier | 0–1 |
| Anti-humectant | 0–1 |

2. A product as claimed in claim 1 in which said soy protein as soy flour constitutes 0.5 to 2% by weight of said product.

3. A product as claimed in claim 1 in which wheat starch replaces wheat flour in amounts up to 50% by weight of the wheat flour.

4. A product as claimed in claim 1 in which an ungelatinized starch having a gelatinization temperature not lower than 150° F. replaces wheat flour in amounts up to 50% by weight of the wheat flour.

* * * * *